(12) United States Patent
Han et al.

(10) Patent No.: US 11,747,689 B2
(45) Date of Patent: Sep. 5, 2023

(54) DISPLAY ASSEMBLY AND DISPLAY APPARATUS

(71) Applicant: BOE TECHNOLOGY GROUP CO., LTD., Beijing (CN)

(72) Inventors: Jiahui Han, Beijing (CN); Shunhang Zhang, Beijing (CN); Pengxia Liang, Beijing (CN); Hua Huang, Beijing (CN); Guoqiang Wang, Beijing (CN); Zheng Fang, Beijing (CN); Ge Shi, Beijing (CN); Yujie Liu, Beijing (CN); Song Yang, Beijing (CN); Shiyu Zhang, Beijing (CN); Yanliu Sun, Beijing (CN); Meina Yu, Beijing (CN); Yuyao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,395

(22) PCT Filed: May 27, 2021

(86) PCT No.: PCT/CN2021/096308
§ 371 (c)(1),
(2) Date: Jun. 23, 2022

(87) PCT Pub. No.: WO2021/239050
PCT Pub. Date: Dec. 2, 2021

(65) Prior Publication Data
US 2023/0060220 A1   Mar. 2, 2023

(30) Foreign Application Priority Data
May 27, 2020 (CN) .......................... 202010463541.3

(51) Int. Cl.
*G02F 1/1362* (2006.01)
*G02F 1/1335* (2006.01)

(52) U.S. Cl.
CPC .. *G02F 1/136286* (2013.01); *G02F 1/133548* (2021.01)

(58) Field of Classification Search
CPC ..................................................... G02F 1/1362
See application file for complete search history.

(56) References Cited

U.S. PATENT DOCUMENTS

2008/0094547 A1* 4/2008 Sugita ................... G02B 5/3058
359/487.03
2012/0062527 A1* 3/2012 Cheong ................. G02F 1/1347
345/204

(Continued)

FOREIGN PATENT DOCUMENTS

CN     106932952 A     7/2017
CN     207882616 U     9/2018

(Continued)

OTHER PUBLICATIONS

Second Office Action for Chinese Patent Application No. 202010463541.3 issued on by the Chinese Patent Office dated Mar. 16, 2023.

(Continued)

*Primary Examiner* — Sang V Nguyen
(74) *Attorney, Agent, or Firm* — IP & T GROUP LLP

(57) ABSTRACT

A display assembly, includes: a first substrate and a second substrate that are disposed opposite, a first liquid crystal layer located between the first substrate and the second substrate, a third substrate disposed at a side of the first substrate away from the second substrate, a second liquid crystal layer located between the first substrate and the third substrate, a first pixel circuit layer disposed between the first substrate and the first liquid crystal layer, a second pixel (Continued)

circuit layer disposed between the third substrate and the second liquid crystal layer, a polarizing device disposed on a side of the second pixel circuit layer away from the second liquid crystal layer, and a first metal wire grid polarizing layer disposed between the first substrate and the first pixel circuit layer. The first metal wire grid polarizing layer is electrically insulated from the first pixel circuit layer.

17 Claims, 10 Drawing Sheets

(56) References Cited

U.S. PATENT DOCUMENTS

| | | | |
|---|---|---|---|
| 2014/0016059 A1 | 1/2014 | Lee et al. | |
| 2014/0028956 A1* | 1/2014 | Choi | G02F 1/133528 359/485.05 |
| 2015/0212239 A1* | 7/2015 | Park | G02B 5/3058 216/24 |
| 2016/0363812 A1* | 12/2016 | Li | G02F 1/134363 |
| 2018/0156953 A1 | 6/2018 | Li | |
| 2021/0116744 A1* | 4/2021 | Im | G02F 1/134309 |

FOREIGN PATENT DOCUMENTS

| | | | | |
|---|---|---|---|---|
| CN | 108983515 | A | 12/2018 | |
| CN | 109031763 | A | 12/2018 | |
| CN | 110297367 | A | 10/2019 | |
| CN | 110346941 | * | 10/2019 | ........... G02F 1/1339 |
| CN | 110346941 | A | 10/2019 | |
| CN | 110579903 | A | 12/2019 | |
| CN | 210199449 | U | 3/2020 | |
| CN | 210222412 | U | 3/2020 | |
| CN | 111487824 | A | 8/2020 | |
| KR | 10-2014-0007648 | A | 1/2014 | |

OTHER PUBLICATIONS

Office Action for the Chinese Patent Application No. 202010463541.3 issued by the Chinese Patent Office dated Aug. 18, 2022.

* cited by examiner

A-A

DISPLAY ASSEMBLY AND DISPLAY APPARATUS

CROSS-REFERENCE TO RELATED APPLICATIONS

This application is a national phase entry under 35 USC 371 of International Patent Application No. PCT/CN2021/096308, filed on May 27, 2021, which claims priority to Chinese Patent Application No. 202010463541.3, filed on May 27, 2020, which are incorporated herein by reference in their entirety.

TECHNICAL FIELD

The present disclosure relates to the field of display technologies, and in particular, to a display assembly and a display apparatus.

BACKGROUND

A dual cell liquid crystal display apparatus includes a main cell and a sub cell; the main cell is also referred to as a display liquid crystal cell, and the sub cell is also referred to as a light control liquid crystal cell. The dual cell liquid crystal display apparatus realizes division of a screen into partitions through the sub cell (e.g., there may be millions of partitions), and light and dark of each partition may be controlled independently. In this way, a dark portion of an image may be darker, thereby improving a contrast of the picture. In addition, an arrangement of the two liquid crystal cells enables the display apparatus to realize a finer brightness adjustment, and thus a displayed image is clearer, has richer details, and is more exquisite.

SUMMARY

In an aspect, a display assembly is provided. The display assembly includes a first substrate and a second substrate that are disposed opposite, a third substrate located at a side of the first substrate away from the second substrate, a first liquid crystal layer located between the first substrate and the second substrate, a second liquid crystal layer located between the third substrate and the first substrate, a first pixel circuit layer disposed between the first substrate and the first liquid crystal layer, a second pixel circuit layer disposed between the third substrate and the second liquid crystal layer, a polarizing device disposed on a side of the second pixel circuit layer away from the second liquid crystal layer, and a first metal wire grid polarizing layer disposed between the first substrate and the first pixel circuit layer. The first metal wire grid polarizing layer is electrically insulated from the first pixel circuit layer.

In some embodiments, the display assembly further includes a first buffer layer. The first buffer layer is disposed between the first metal wire grid polarizing layer and the first pixel circuit layer.

In some embodiments, a thickness of the first buffer layer is in a range from 1.27 μm to 7.0 μm.

In some embodiments, the first pixel circuit layer includes at least one first signal line. The first metal wire grid polarizing layer includes at least one first discontinuous region each extending in an extending direction of a first signal line, and an orthogonal projection of the first signal line on the first substrate and an orthogonal projection of a first discontinuous region on the first substrate have an overlapping region.

In some embodiments, borders of the orthogonal projection of the first signal line on the first substrate that extend in the extending direction of the first signal line are within borders of the orthogonal projection of the first discontinuous region on the first substrate that extend in the extending direction of the first discontinuous region; and in a width direction of the first signal line, a gap exists between a border of the orthogonal projection of the first signal line on the first substrate that extends in the extending direction of the first signal line and a border, close to the border of the orthogonal projection of the first signal line, of the orthogonal projection of the first discontinuous region on the first substrate that extends in the extending direction of the first discontinuous region.

In some embodiments, the at least one first signal line includes a plurality of first signal lines, and the plurality of first signal lines include first gate lines and/or first data lines.

In some embodiments, the display assembly further includes a first common electrode layer. The first common electrode layer and the first metal wire grid polarizing layer are arranged in a stack, and a surface of the first common electrode layer is in direct contact with a surface of the first metal wire grid polarizing layer that is adjacent to the surface of the first common electrode layer; or the display assembly further includes a first buffer layer, the first common electrode layer is disposed on a side of the first buffer layer away from the first metal wire grid polarizing layer and located between the first pixel circuit layer and the first buffer layer.

In some embodiments, the first wire grid polarizing layer is used as a first common electrode layer.

In some embodiments, the first pixel circuit layer includes a plurality of first pixel electrodes distributed in an array. The first metal wire grid polarizing layer includes a plurality of first metal bars and a plurality of first connection portions. Two adjacent first metal bars are connected through at least one first connection portion, and orthogonal projections of the plurality of first connection portions on the first substrate are separated from orthogonal projections of the plurality of first pixel electrodes on the first substrate.

In some embodiments, the polarizing device is a second metal wire grid polarizing layer, the second metal wire grid polarizing layer is disposed between the third substrate and the second pixel circuit layer, and the second metal wire grid polarizing layer is electrically insulated from the second pixel circuit layer.

In some embodiments, the display assembly further includes a second buffer layer, and the second buffer layer is disposed between the second metal wire grid polarizing layer and the second pixel circuit layer.

In some embodiments, a thickness of the second buffer layer is in a range from 1.27 μm to 7.0 μm.

In some embodiments, the second pixel circuit layer includes at least one second signal line. The second metal wire grid polarizing layer includes at least one second discontinuous region each extending in an extending direction of a second signal line, and an orthogonal projection of the second signal line on the third substrate and an orthogonal projection of a second discontinuous region on the third substrate have an overlapping region.

In some embodiments, borders of the orthogonal projection of the second signal line on the third substrate that extend in the extending direction of the second signal line are within borders of the orthogonal projection of the second discontinuous region on the third substrate that extend in the extending direction of the second discontinuous region; and in a width direction of the second signal line, a gap exists between a border of the orthogonal projection of the second signal line on the third substrate that extends in the extending direction of the second signal line and a border, close to the border of the orthogonal projection of the second signal line, of the orthogonal projection of the second discontinuous region on the third substrate that extends in the extending direction of the second discontinuous region.

In some embodiments, the at least one second signal line includes a plurality of second signal lines, and the plurality of second signal lines include second gate lines and/or second data lines.

In some embodiments, the display assembly further includes a second common electrode layer. The second common electrode layer and the second metal wire grid polarizing layer are arranged in a stack, and a surface of the second common electrode layer is in direct contact with a surface of the second metal wire grid polarizing layer that is adjacent to the surface of the second common electrode layer; or the display assembly further includes a second buffer layer, the second common electrode layer is disposed on a side of the second buffer layer away from the second metal wire grid polarizing layer and located between the second buffer layer and the second pixel circuit layer.

In some embodiments, the second wire grid polarizing layer is used as a second common electrode layer.

In some embodiments, the second pixel circuit layer includes a plurality of second pixel electrodes distributed in an array. The second metal wire grid polarizing layer includes a plurality of second metal bars and a plurality of second connection portions.

Two adjacent second metal bars are connected through at least one second connection portion, and orthogonal projections of the plurality of second connection portions on the third substrate are separated from orthogonal projections of the plurality of second pixel electrodes on the third substrate.

In another aspect, a display apparatus is provided. The display apparatus includes a backlight module and the display assembly as described in any one of the above embodiments. The backlight module is disposed on a side of the third substrate of the display assembly away from the second liquid crystal layer.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
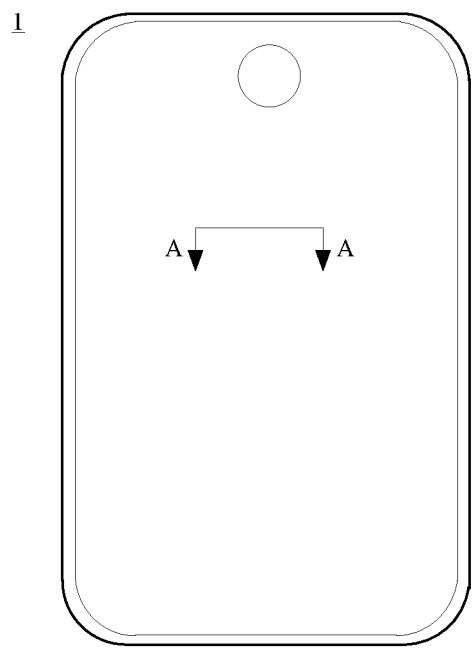
FIG. 1 is a schematic diagram of a display apparatus, in accordance with some embodiments.

Technical solutions in some embodiments of the present disclosure will be described clearly and completely with reference to the accompanying drawings below.

Obviously, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to". In the description of the specification, the terms such as "some embodiments", "exemplary embodiments" or "example" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, unless otherwise specified, the term "a plurality of/the plurality of" means two or more.

In the description of some embodiments, terms such as "connected" and derivatives thereof may be used. For example, the term "connected" may be used in the description of some embodiments to indicate that two or more components are in direct physical or electrical contact with each other.

The phrase "A and/or B" includes the following three combinations: only A, only B, and a combination of A and B.

The use of "configured to" herein means an open and inclusive expression, which does not exclude devices that are applicable to or configured to perform additional tasks or steps.

As used herein, the term such as "about", "substantially" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the accompanying drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but includes shape deviations due to, for example, manufacturing. For example, an etched region shown as a rectangle shape generally has a curved feature. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a display apparatus 1. Referring to FIG. 1, the display apparatus 1 may be a television, a computer, a notebook computer, a mobile phone, a tablet computer, a personal digital assistant (abbreviated as PDA), vehicle computer, etc.

In some embodiments, the display apparatus 1 may be a liquid crystal display (abbreviated as LCD) apparatus. In order to achieve a finer brightness adjustment, the liquid crystal display apparatus may be a liquid crystal display apparatus including double layers of liquid crystal cells (e.g., a main cell and a sub cell), and the sub cell realizes division of the display apparatus into partitions and brightness adjusting of the partition, thereby improving a contrast of an image.

Figure 2:
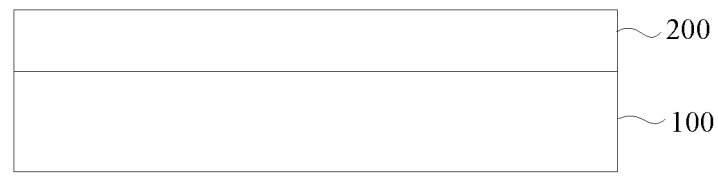
FIG. 2 is a sectional view of the display apparatus in FIG. 1 taken along the A-A line.

Referring to FIG. 2, the display apparatus 1 includes a backlight module 100 and a display assembly 200.

Figure 3A:
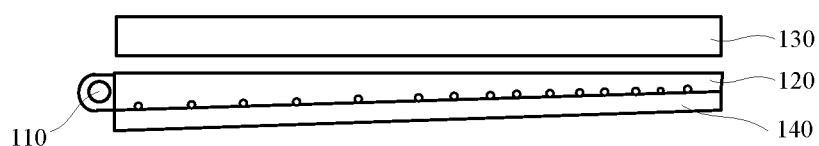
FIG. 3A is a structural diagram of a backlight module, in accordance with some embodiments.

Referring to FIG. 3A, the backlight module 100 includes backlight source(s) 110, a light guide plate 120, and an optical film 130 disposed on a light exit side of the light guide plate 120. The optical film 130 may include, for example, a diffusion sheet and/or a brightness enhancement film. The backlight source 110 may be, for example, a light-emitting diode (abbreviated as LED). There are two shapes of the light guide plate 120, i.e. a wedge shape and a flat plate shape. FIG. 3A illustrates that the light guide plate 120 has the wedge shape. For example, the brightness enhancement film may include a prism film and/or a dual brightness enhancement film (abbreviated as DBEF).

Figure 3B:
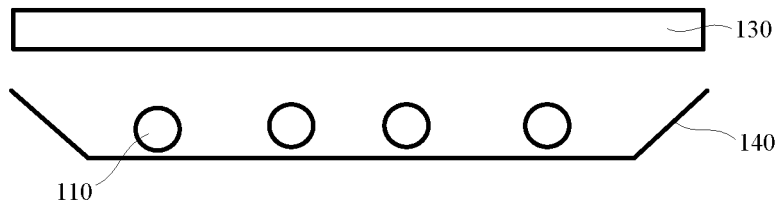
FIG. 3B is a structural diagram of another backlight module, in accordance with some embodiments.

As shown in FIG. 3A, the backlight source 110 may be disposed at a side face of the light guide plate 120; and in this case, the backlight module 100 is an edge-lit backlight module. As shown in FIG. 3B, the backlight source 110 may be disposed at a side of the optical film 130 away from the light exit side; and in this case, the backlight module 100 is a direct-lit backlight module. Structures of the backlight module 100 in FIGS. 3A and 3B are only for illustration, which is not limited. In addition, as shown in FIGS. 3A and 3B, the backlight module 100 may further include a reflective sheet 140, and the reflective sheet 140 is disposed on a side of the light guide plate 120 away from the light exit side.

Figure 4:
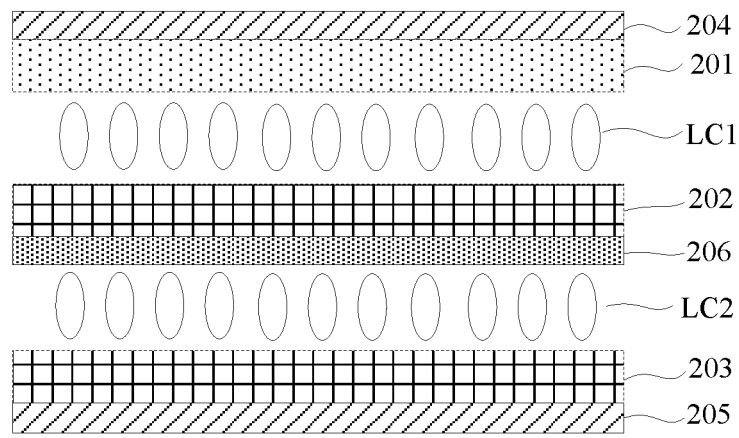
FIG. 4 is a structural diagram of a display assembly in the related art.

In a case where a display apparatus 1 includes the double layers of liquid crystal cells, in the related art, referring to FIG. 4, a display assembly 200 includes a color filter substrate 201 and a first array substrate 202 that are disposed opposite, and a first liquid crystal layer LC1 disposed between the color filter substrate 201 and the first array substrate 202. The color filter substrate 201, the first array substrate 202 and the first liquid crystal layer LC1 constitute the main cell. The display assembly 200 further includes a second array substrate 203 disposed at a side of the first array substrate 202 away from the color filter substrate 201, and a second liquid crystal layer LC2 disposed between the first array substrate 202 and the second array substrate 203. The second array substrate 203, the second liquid crystal layer LC2 and the first array substrate 202 constitute the sub cell.

In the related art, referring to FIG. 4, in order to cooperate with the optical activity of liquid crystal to achieve brightness control of the display assembly 200, the display assembly 200 further includes three polarizing devices, which are a first polarizing device 204 attached on a side of the color filter substrate 201 away from the first array substrate 202, a second polarizing device 205 attached on a side of the second array substrate 203 away from the first array substrate 202, and a third polarizing device 206 disposed between the first array substrate 202 and the second liquid crystal layer LC2.

For example, the first polarizing device 204 and the second polarizing device 205 may be polarizers; and the third polarizing device 206 may be a metal wire grid polarizing layer. The third polarizing device 206 is disposed in the sub cell and the metal wire grid polarizing layer is mainly made of a metal material, so that it will adversely affect an electric field in the sub cell and reduce an efficiency of the liquid crystal in the sub cell. The efficiency of the liquid crystal refers to an ability of the liquid crystal for deflecting linearly polarized light.

Figure 5A:
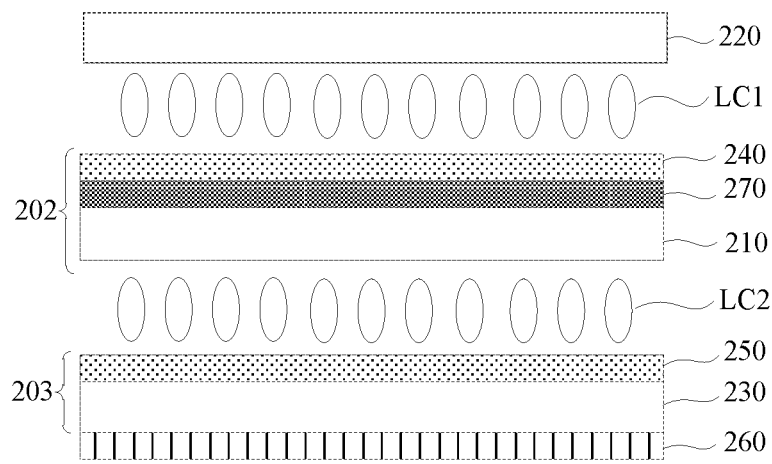
FIG. 5A is a structural diagram of a display assembly, in accordance with some embodiments.
Figure 5B:
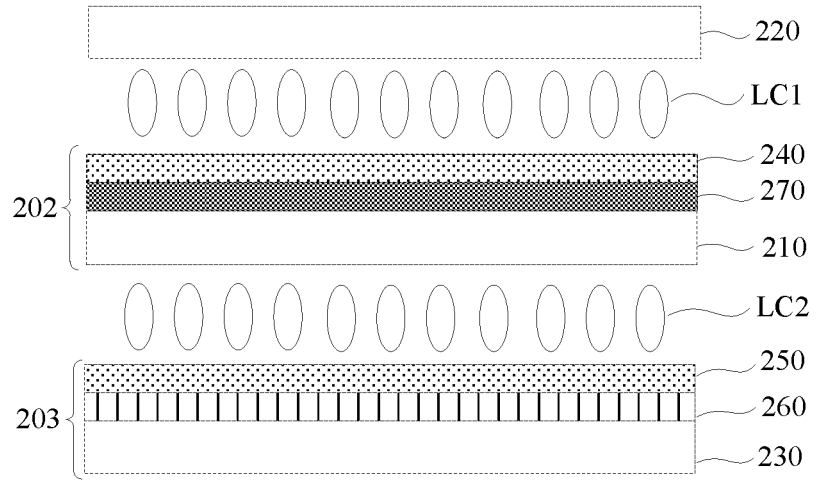
FIG. 5B is a structural diagram of another display assembly, in accordance with some embodiments.

Some embodiments of the present disclosure provide a display assembly 200. Referring to FIGS. 5A and 5B, the display assembly 200 includes: a first substrate 210 and a second substrate 220 that are disposed opposite, a third substrate 230 located at a side of the first substrate 210 away from the second substrate 220, a first liquid crystal layer LC1 located between the first substrate 210 and the second substrate 220, a second liquid crystal layer LC2 located between the first substrate 210 and the third substrate 230, a first pixel circuit layer 240 disposed on a side of the first substrate 210 proximate to the first liquid crystal layer LC1, a second pixel circuit layer 250 disposed on a side of the third substrate 230 proximate to the second liquid crystal layer LC2, a polarizing device 260, and a first metal wire grid polarizing layer 270.

The polarizing device 260 is disposed on a side of the second pixel circuit layer 250 away from the second liquid crystal layer LC2, and at least the second pixel circuit layer 250 is between the polarizing device 260 and the second liquid crystal layer LC2. In this way, an influence of the polarizing device 260 on an electric field applied to the second liquid crystal layer LC2 may be reduced. The embodiments of the present disclosure do not limit a type of the polarizing device 260. For example, the polarizing device 260 may be a polarizer.

For example, referring to FIG. 5A, the polarizing device 260 may be disposed on a side of the third substrate 230 away from the second pixel circuit layer 250 (i.e. below the third substrate 230 in FIG. 5A). In this way, a protective layer is needed to be provided on a side of the polarizing device 260 away from the third substrate 230. The protective layer includes at least one of a water-oxygen barrier layer and a manipulator transmission ensuring layer (which may be referred to as an anti-scratch layer). For example, referring to FIG. 5B, the polarizing device 260 may be disposed between the third substrate 230 and the second pixel circuit layer 250. In this way, there is no need to provide a protective layer on the polarizing device 260. Therefore, a light transmittance of the display apparatus 1 is improved.

The first metal wire grid polarizing layer 270 is disposed between the first substrate 210 and the first pixel circuit layer 240, and the first metal wire grid polarizing layer 270 is electrically insulated from the first pixel circuit layer 240. The first metal wire grid polarizing layer 270 is made of a conductive material (a metal simple substance or an alloy). The first metal wire grid polarizing layer 270 is electrically insulated from the first pixel circuit layer 240, and thus, it is possible to prevent the first pixel circuit layer 240 from being in direct contact with the first metal wire grid polarizing layer 270, and prevent from short circuits of pixel circuits in the first pixel circuit layer 240. For example, at least one insulating layer may be provided between the first metal wire grid polarizing layer 270 and the first pixel circuit layer 240.

In the display assembly 200 provided in the embodiments of the present disclosure, referring to FIGS. 5A and 5B, the first metal wire grid polarizing layer 270 is disposed between the first substrate 210 and the first pixel circuit layer 240, so that at least the first substrate 210 is between the first metal wire grid polarizing layer 270 and the second liquid crystal layer LC2, which may reduce an influence of the first metal wire grid polarizing layer 270 on the electric field applied to the second liquid crystal layer LC2. Moreover, the first pixel circuit layer 240 is between the first metal wire grid polarizing layer 270 and the first liquid crystal layer LC1, which may reduce an influence of the first metal wire grid polarizing layer 270 on an electric field applied to the first liquid crystal layer LC1. Therefore, compared with the related art, the display assembly 200 provided in the embodiments of the present disclosure may increase a deflection angle of the liquid crystal in the liquid crystal cell, thereby improving the efficiency of the liquid crystal in the liquid crystal cell.

In some embodiments of the present disclosure, the substrate (e.g. the first substrate 210, the second substrate 220 or the third substrate 230) may be a rigid substrate such as a glass substrate, or may be a flexible substrate such as a polyimide (PI) substrate.

Liquid crystal molecules in the liquid crystal layer (e.g. the first liquid crystal layer LC1 or the second liquid crystal layer LC2) in the display assembly 200 need to be driven by an electric field generated between a pixel electrode and a common electrode, so that the liquid crystal molecules to be twisted and a degree of an optical rotation of the liquid crystal layer is adjusted. For example, a fixed voltage, such as a common voltage (a COM voltage), may be provided for the common electrode, and a variable voltage may be provided for the pixel electrode, so as to adjust the electric field applied to the liquid crystal layer, thereby controlling deflection angles of the liquid crystal molecules and adjusting the degree of the optical rotation of the liquid crystal molecules.

The pixel circuit layer (e.g. the first pixel circuit layer 240 or the second pixel circuit layer 250) refers to a layer where pixel circuits are located. The first pixel circuit layer 240 is taken as an example, referring to FIG. 6, the first pixel circuit layer 240 includes a plurality of pixel circuits distributed in an array, the plurality of pixel circuits are arranged in rows and columns, and each row of pixel circuits and each column of pixel circuits both include pixel circuits.

Figure 6:
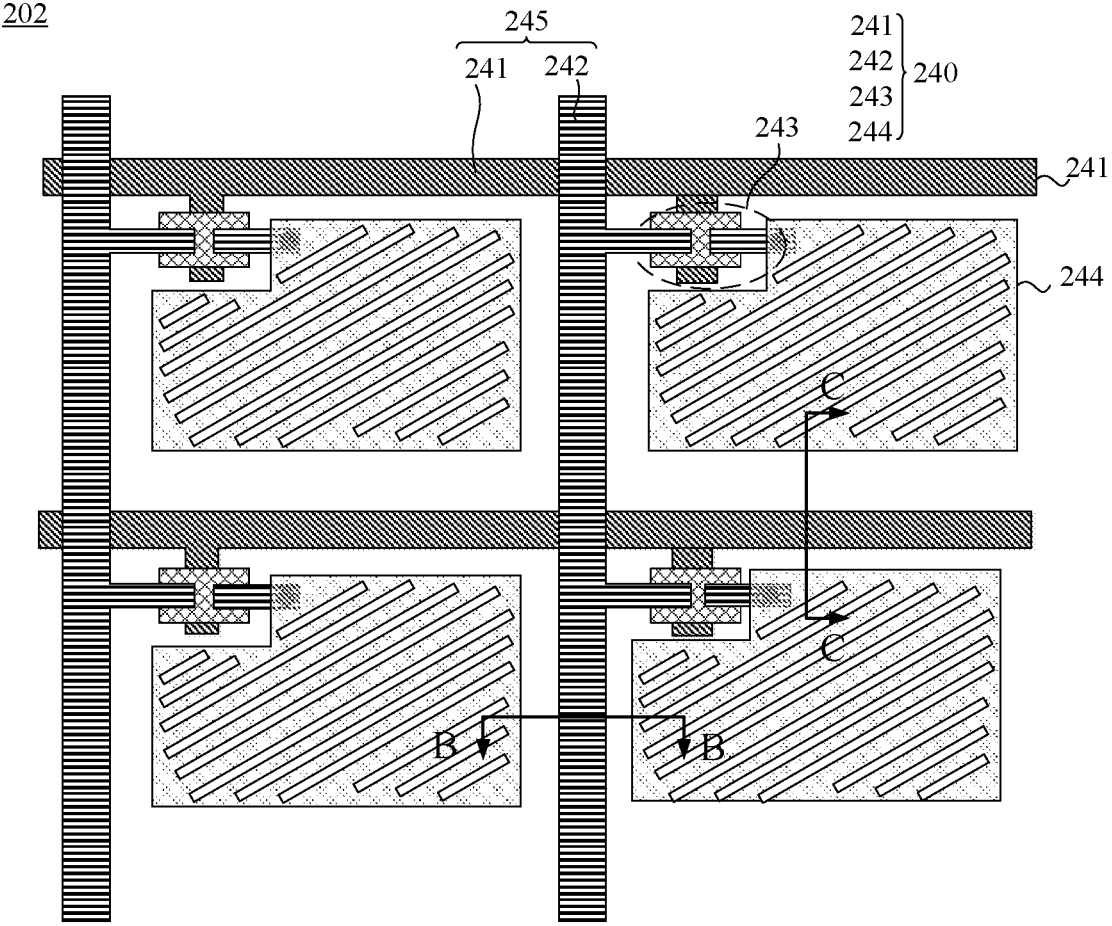
FIG. 6 is a structural diagram of a first array substrate, in accordance with some embodiments.

For example, referring to FIG. 6, FIG. 6 is a structural diagram of the first pixel circuit layer 240 of a first array substrate 202. A pixel circuit in the first pixel circuit layer 240 includes: a portion of a first gate line 241, a portion of a first data line 242, a thin film transistor 243 and a first pixel electrode 244. An extending direction of the first gate line 241 intersects an extending direction of the first data line 242; the thin film transistor 243 is electrically connected to the first gate line 241, the first data line 242 and the first pixel electrode 244, and is configured to input a voltage signal from the first data line 242 to the first pixel electrode 244 under control of a control signal from the first gate line 241. The pixel circuits located in the same row share the same first gate line 241, and the pixel circuits located in the same column share the same first data line 242.

Figure 7:
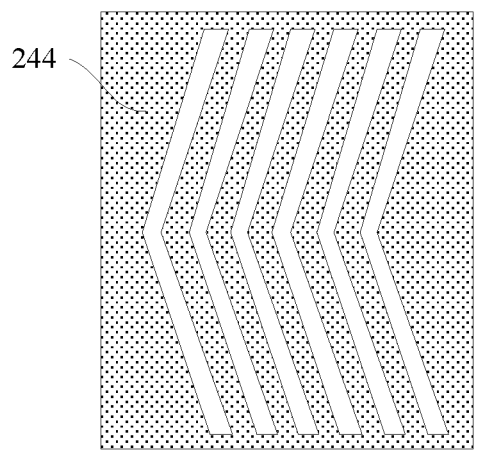
FIG. 7 is a structural diagram of a first pixel electrode, in accordance with some embodiments.

A shape of the first pixel electrode 244 may refer to FIG. 6. Of course, the shape of the first pixel electrode 244 is not limited in the embodiments of the present disclosure. For example, the first pixel electrode 244 may also be a two-domain pixel electrode as shown in FIG. 7.

The polarizing device 260 refers to a device having a polarization direction, so that linearly polarized light whose vibration direction is parallel to the polarization direction exit. For example, the polarizing device 260 may be the metal wire grid polarizing layer, which includes a plurality of metal bars that are arranged in parallel, and a material of the metal bar may be the metal simple substance or a metal alloy. For example, the polarizing device 260 may be the polarizer, which may include a polyvinyl alcohol (PVA) layer located in the middle and triacetate cellulose (TAC) layers located on both sides of the PVA layer. The polarizer may be an iodine-based polarizer or a dye-based polarizer. A type of the polarizing device 260 is not limited in the embodiments of the present disclosure. For example, the polarizing device 26 may also be a polarizing prism, such as a Nicol prism.

Those skilled in the art can understand that insulating layer(s) are generally provided between two adjacent conductive material layers. Therefore, the pixel circuit layer may further include a gate insulating layer and other insulating layer(s), such as a passivation (abbreviated as PVX) layer.

It will be noted that, in the embodiments of the present disclosure, only partial structures of the display assembly 200 that are related to the solutions of the embodiments of the present disclosure are described. Those skilled in the art can obtain known structures that are not shown, which will not be described in detail. For example, the display assembly 200 further includes an upper polarizer, and the upper polarizer is disposed on a side of the second substrate 220 away from the first substrate 210.

Referring to FIG. 5A, in the case where the first metal wire grid polarizing layer 270 is disposed between the first substrate 210 and the first pixel circuit layer 240, the first substrate 210, the first metal wire grid polarizing layer 270 and the first pixel circuit layer 240 constitute the first array substrate 202. That is, the first array substrate 202 includes the first metal wire grid polarizing layer 270. With continued reference to FIG. 5A, in the case where the polarizing device 260 is disposed on the side of the third substrate 230 away from the second pixel circuit layer 250, the third substrate 230 and the second pixel circuit layer 250 constitute a second array substrate 203. That is, the second array substrate 203 does not include the polarizing device 260. Referring to FIG. 5B, in the case where the polarizing device 260 is disposed between the third substrate 230 and the second pixel circuit layer 250, the third substrate 230, the polarizing device 260 and the second pixel circuit layer 250 constitute the second array substrate 203. That is, the second array substrate 203 includes the polarizing device 260.

The display assembly 200 in the embodiments of the present disclosure includes at least one metal wire grid polarizing layer. In order to distinguish metal wire grid polarizing layers at different positions, terms such as "first" and "second" are respectively added in front of them to obtain the above "first metal wire grid polarizing layer" and the below "second metal wire grid polarizing layer", and structures and materials thereof may refer to the description of the above metal wire grid polarizing layer.

Figure 8:
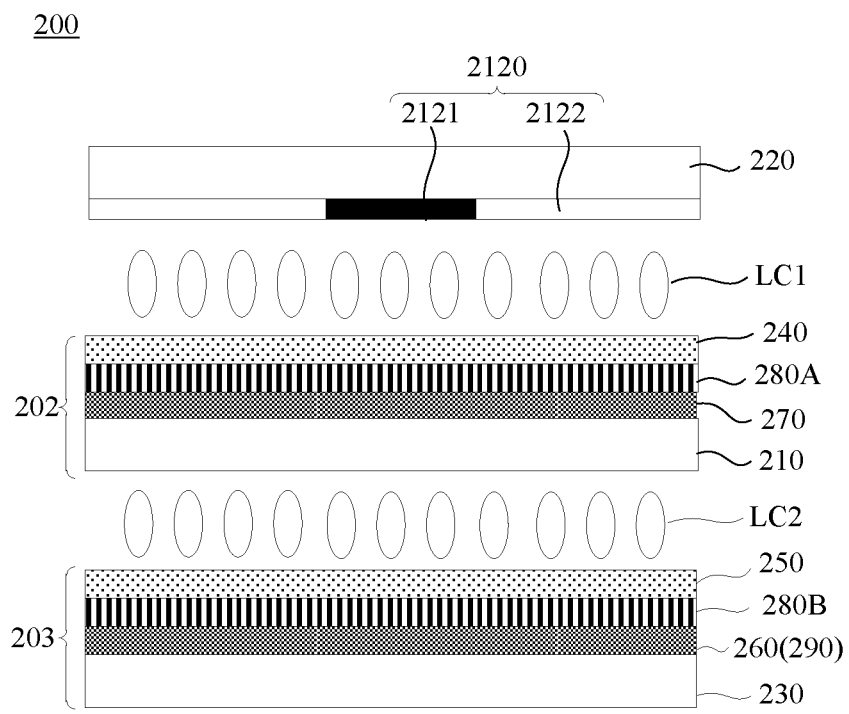
FIG. 8 is a structural diagram of yet another display assembly, in accordance with some embodiments.

In some embodiments, as shown in FIG. 8, the display assembly 200 further includes a first buffer layer 280A disposed between the first metal wire grid polarizing layer 270 and the first pixel circuit layer 240. The first buffer layer 280A is capable of separating the first metal wire grid polarizing layer 270 and the first pixel circuit layer 240, so that the first metal wire grid polarizing layer 270 is electrically insulated from the first pixel circuit layer 240, which weakens an influence of the first metal wire grid polarizing layer 270 on the pixel circuits in the first pixel circuit layer 240.

A material of the first buffer layer 280A is an insulating material, which may be an inorganic material or an organic material. The inorganic material may include any one of silicon nitride, silicon oxynitride, and silicon oxide, so that the first buffer layer 280A has a relatively high light transmittance.

In some embodiments, a thickness of the first buffer layer 280A is in a range from 1.27 µm to 7 µm. For example, the thickness of the first buffer layer may be 1.27 µm, 1.3 µm, 3 µm, 5 µm or 7 µm, etc., which will not be listed here.

The thickness of the first buffer layer 280A is inversely proportional to the light transmittance of the first buffer layer 280A. That is, the thicker the first buffer layer 280A, the lower the light transmittance thereof. Therefore, in the embodiments of the present disclosure, the thickness of the first buffer layer 280A is less than or equal to 7 µm. As a result, it is conducive to improving the light transmittance of the first buffer layer 280A, and further improving a utilization rate of backlight of the display apparatus 1; and furthermore, it is conducive to reducing a thickness of the display assembly 100, so as to realize lightness and thinness of the display assembly 100.

In the case where the first metal wire grid polarizing layer 270 is disposed between the first substrate 210 and the first pixel circuit layer 240, capacitances may be generated between the first pixel circuit layer 240 and the first metal wire grid polarizing layer 270, and the capacitances will affect transmission of signals of the first pixel circuit layer 240. The thickness of the first buffer layer 280A is greater than or equal to 1.27 µm, so that a distance between the first metal wire grid polarizing layer 270 and the first pixel circuit layer 240 (which includes the first data lines and the first gate lines) may be increased. As a result, the capacitances between the first metal wire grid polarizing layer 270 and the first pixel circuit layer 240 may be reduced, thereby reducing the influence of the first metal wire grid polarizing layer 270 on the pixel circuits (including the first data lines and the first gate lines).

Figure 9A:
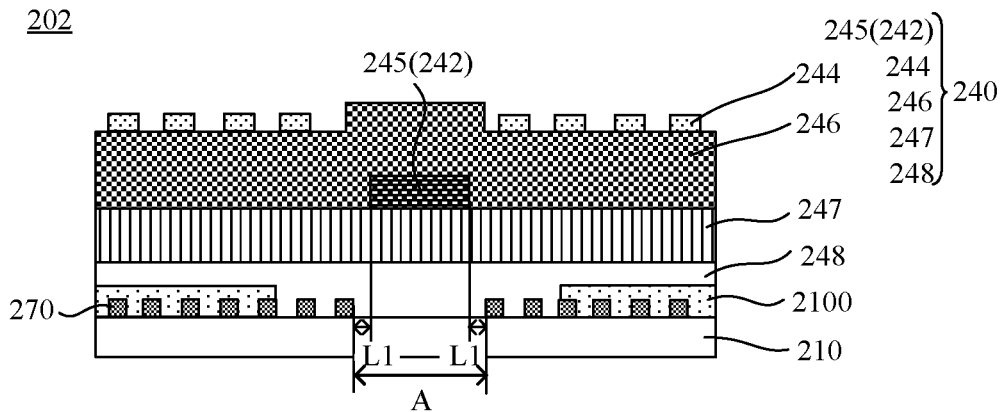
FIG. 9A is a sectional view of the first array substrate in FIG. 6 taken along the B-B line.
Figure 9B:
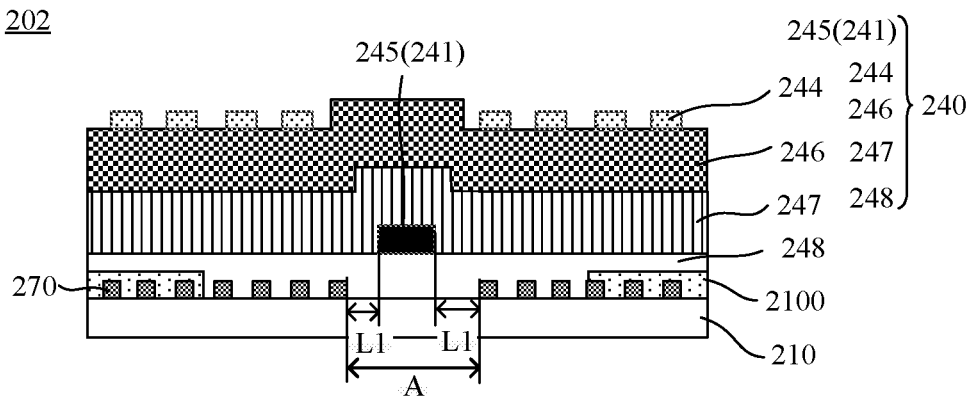
FIG. 9B is a sectional view of the first array substrate in FIG. 6 taken along the C-C line.

In some embodiments, as shown in FIGS. 6, 9A and 9B, the first pixel circuit layer 240 includes at least one first signal line 245. The first wire grid polarizing layer 270 inlcudes first discontinuous region(s) A each extending in an extending direction of a first signal line 245. That is, an extending direction of a first discontinuous region A is the same as the extending direction of the first signal line 245. An orthogonal projection of the first signal line 245 on the first substrate 210 and an orthogonal projection of the first discontinuous region A on the first substrate 210 have an overlapping region. In a case where the first wire grid polarizing layer 270 inlcudes a plurality of first metal bars, the plurality of first metal bars are not disposed in the first discontinuous region A.

The first signal line(s) 245 include at least one of the first gate lines 241 and the first data lines 242, which may be specifically determined according to actual usage needs and will not be limited in the embodiments of the present disclosure. FIG. 9A is a sectional view of the first array substrate 202 shown in FIG. 6 taken along the B-B line in a case where the first signal line 245 is the first data line 242; and FIG. 9B is a sectional view of the first array substrate 202 shown in FIG. 6 taken along the C-C line in a case where the first signal line 245 is the first gate line 241.

The orthogonal projection of the first signal line 245 on the first substrate 210 refers to a projection of the first signal line 245 on the first substrate 210 in a thickness direction of the first substrate 210. The orthogonal projection of the first discontinuous region A on the first substrate 210 refers to a projection of the first discontinuous region A on the first substrate 210 in the thickness direction of the first substrate 210.

The orthogonal projection of the first signal line 245 on the first substrate 210 and the orthogonal projection of the first discontinuous region A on the first substrate 210 have the overlapping region, which may be that orthogonal projections of the two (the first signal line 245 and the first discontinuous region A) completely overlap, or the orthogonal projections of the two partially overlap. In the case where the orthogonal projections of the two completely overlap, the orthogonal projection of the first signal line 245 may be completely located within the orthogonal projection of the first discontinuous region A, or the orthogonal projection of the first discontinuous region A may completely coincide with the orthogonal projection of the first signal line. In the case where the orthogonal projections of the two partially overlap, it may be that a portion of the orthogonal projection of the first discontinuous region A is located within the orthogonal projection of the first signal line 245, and the other portion of the orthogonal projection of the first discontinuous region A is located outside the orthogonal projection of the first signal line 245.

The first discontinuous region A is arranged in the first metal wire grid polarizing layer 270, which may reduce a facing area between the first metal wire grid polarizing layer 270 and the first signal line 245 (e.g. the first data line or the first gate line), thereby reducing or eliminating a capacitance formed between the first metal wire grid polarizing layer 270 and the first signal line 245, and reducing an influence of the first metal wire grid polarizing layer 270 on the first signal line 245.

Figure 10A:
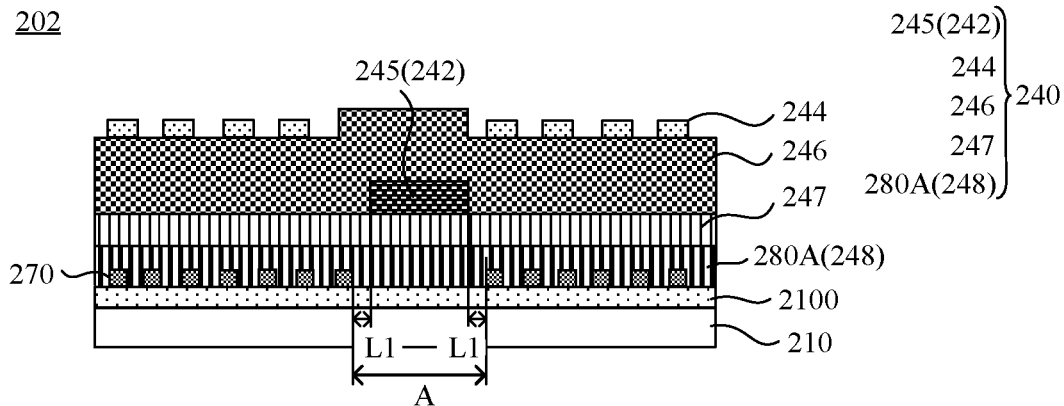
FIG. 10A is another sectional view of the first array substrate in FIG. 6 taken along the B-B line.
Figure 10B:
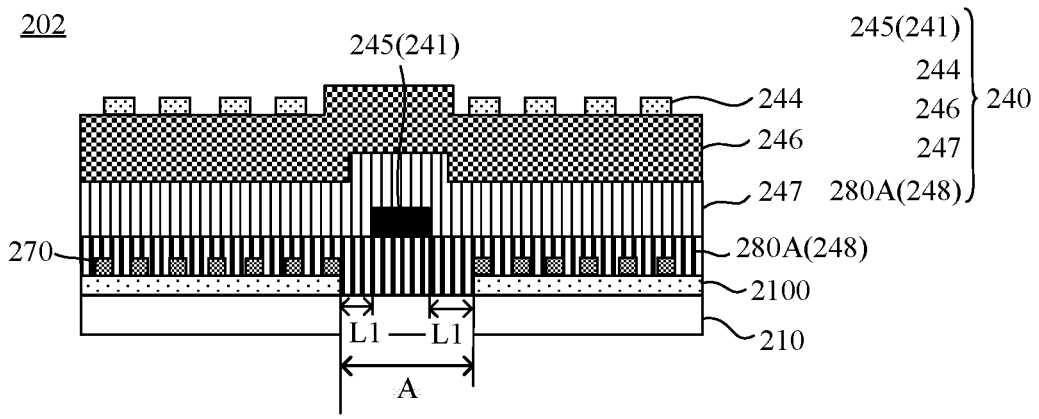
FIG. 10B is another sectional view of the first array substrate in FIG. 6 taken along the C-C line.

Those skilled in the art will understand that at least one insulating layer is provided between two adjacent conductive layers. Based on this, as shown in FIGS. 9A and 9B, the first pixel circuit layer 240 may further include a first passivation layer 246, a first gate insulating layer 247 and at least one insulating layer 248. Referring to FIGS. 10A and 10B, in the case where the display assembly 100 includes the first buffer layer 280A, the at least one insulating layer 248 may include the first buffer layer 280A.

In some embodiments, referring to FIGS. 10A and 10B, in the case where the first discontinuous region A is arranged in the first metal wire grid polarizing layer 270, the display assembly 200 is provided with the first buffer layer 280A therein, so that the influence of the first metal wire grid polarizing layer 270 on the first signal line 245 may be further reduced. Therefore, the thickness of the first buffer layer 280A may be set smaller. For example, the thickness of the first buffer layer 280A may be less than 1.3 μm. For example, the thickness of the first buffer layer 280A may be less than 1.3 μm and greater than or equal to 0.4 μm. For example, it may be 1.27 μm, 1 μm, 0.4 μm, etc.

In some embodiments, referring to FIGS. 10A and 10B, borders of the orthogonal projection of the first signal line 245 on the first substrate 210 that extend in the extending direction of the first signal line 245 are within borders of the orthogonal projection of the first discontinuous region A on the first substrate 210 that extend in the extending direction of the first discontinuous region A; and in a width direction of the first signal line 245, there is a gap L1 between a border of the orthogonal projection of the first signal line 245 on the first substrate 210 that extends in the extending direction of the first signal line 245 and a border, close to the border of the orthogonal projection of the first signal line 245, of the orthogonal projection of the first discontinuous region A on the first substrate 210 that extends in the extending direction of the first discontinuous region A. That is, the orthogonal projection of the first signal line 245 may be completely located within the orthogonal projection of the first discontinuous region A.

For example, a width of the gap L1 may be in a range from 3 μm to 4 μm. In this way, it is possible to prevent from having a directly facing portion between the first signal line 245 and the first metal wire grid polarizing layer 270 (the orthogonal projection of the first signal line 245 on the first substrate 210 is separated from the orthogonal projection of the first metal wire grid polarizing layer 270 on the first substrate 210), and the capacitance between the first metal wire grid polarizing layer 270 and the first signal line 245 may be avoided. According to experimental data, it can be known that, when a simulation is performed on a display assembly 100 of a display apparatus 1 with a display screen of 65 inches, a resolution of 8 K and a frequency of 60 Hz, a simulation effect of the display assembly 100 is best in a case where the width of the gap L1 is set in the range from 3 μm to 4 μm.

In some embodiments, the first pixel circuit layer 240 includes a plurality of first signal lines 245, the plurality of first signal lines 245 include the first gate lines 241 and/or the first data lines 242, which may be specifically determined according to actual usage needs and will not be limited in the embodiments of the present disclosure.

Referring to FIG. 6, the first pixel circuit layer 240 includes the first gate lines 241 and the first data lines 242, and the plurality of first signal lines 245 include the first gate lines 241 and/or the first data lines 242. In this way, the orthogonal projection of the first signal line 245 on the first substrate 210 and the orthogonal projection of the first discontinuous region A on the first substrate 210 have the overlapping region, which may be that an orthogonal projection of the first gate line 241 on the first substrate 210 has an overlapping region with the orthogonal projection of the first discontinuous region A on the first substrate 210; or an orthogonal projection of the first data line 242 on the first substrate 210 has an overlapping region with the orthogonal projection of the first discontinuous region A on the first substrate 210. In the case where the plurality of first signal lines 245 include the first gate lines 241 and the first data lines 242, orthogonal projections of the first gate line 241 and the first data line 242 on the first substrate 210 each have an overlapping region with an orthogonal projection of a respective first discontinuous region A on the first substrate 210.

In some embodiments, referring to FIGS. 9A to 14B, the display assembly 100 may further include a first common electrode layer 2100. Electric fields may be generated between the first common electrode layer 2100 and the first pixel electrodes 244, so as to drive liquid crystal molecules in the first liquid crystal layer LC1 to deflect. The first common electrode layer 2100 and the first pixel electrodes 244 are all disposed on the first substrate 210; and in this case, a liquid crystal cell composed of the first substrate 210, the second substrate 220 and the first liquid crystal layer LC1 disposed therebetween may be a liquid crystal cell with an in-plane switching (abbreviated as IPS) mode or an advanced super dimension switch (abbreviated as ADS) mode.

In some embodiments, referring to FIGS. 9A to 10B and 12A to 13B, the first common electrode layer 2100 and the first metal wire grid polarizing layer 270 are arranged in a stack, and a surface of the first common electrode layer 2100 is in direct contact with a surface of the first metal wire grid polarizing layer 270 that is adjacent to the surface of the first common electrode layer 2100. The first common electrode layer 2100 and the first metal wire grid polarizing layer 270 are both conductive layers, and they are in direct contact and electrically connected. As a result, the first common electrode layer 2100 is connected in parallel with the first metal wire grid polarizing layer 270, and thus an impedance of the first common electrode layer 2100 may be reduced. The expression "arranged in a stack" means that the first common electrode layer 2100 and the first metal wire grid polarizing layer 270 are arranged in sequence in the thickness direction of the first substrate 210, and the surface of the first common electrode layer 2100 is in direct contact with the surface of the first metal wire grid polarizing layer 270 that is adjacent to the surface of the first common electrode layer 2100 (that is, the first common electrode layer 2100 and the first metal wire grid polarizing layer 270 are two adjacent layers).

In an example where the first signal line 245 is the first data line 242, referring to FIG. 9A, the first common electrode layer 2100 may be disposed on a side of the first metal wire grid polarizing layer 270 away from the first substrate 210. Alternatively, referring to FIGS. 10A, 12A and 13A, the first common electrode layer 2100 may be disposed on a side of the first metal wire grid polarizing layer 270 proximate to the first substrate 210. That is, the first common electrode layer 2100 is disposed below the first metal wire grid polarizing layer 270.

In an example where the first signal line 245 is the first gate line 241, referring to FIG. 9B, the first common electrode layer 2100 may be disposed on the side of the first metal wire grid polarizing layer 270 away from the first substrate 210. Alternatively, referring to FIGS. 10B, 12B and 13B, the first common electrode layer 2100 may be disposed on the side of the first metal wire grid polarizing layer 270 proximate to the first substrate 210. That is, the first common electrode layer 2100 is disposed below the first metal wire grid polarizing layer 270.

In some embodiments, as shown in FIGS. 11A, 11B, 14A and 14B, in the case where the first buffer layer 280A is disposed on the first substrate 210, the first common electrode layer 2100 may be disposed on a side of the first buffer layer 280A away from the first metal wire grid polarizing layer 270 and is located between the first buffer layer 280A and the first pixel circuit layer 240. In this way, the first buffer layer 280A is between the first common electrode layer 2100 and the first wire grid polarizing layer 270, and the first common electrode layer 2100 and the first metal wire grid polarizing layer 270 are insulated from each other.

Figure 11A:
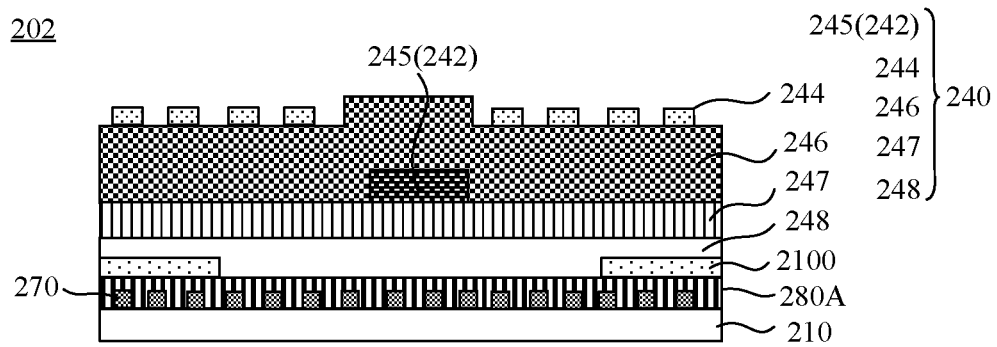
FIG. 11A is yet another sectional view of the first array substrate in FIG. 6 taken along the B-B line.
Figure 14A:
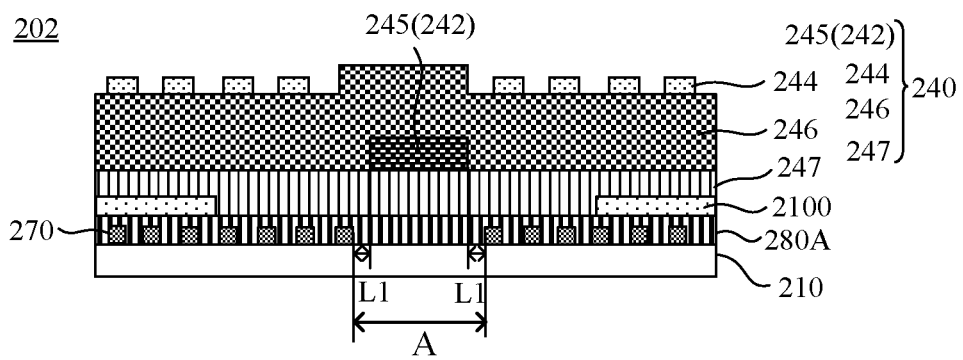
FIG. 14A is yet another sectional view of the first array substrate in FIG. 6 taken along the B-B line.

In an example where the first signal line 245 is the first data line 242, as shown in FIGS. 11A and 14A, in the case where the first buffer layer 280A is disposed on the first substrate 210, the first buffer layer 280A is between the first common electrode layer 2100 and the first metal wire grid polarizing layer 270, and the first common electrode layer 2100 and the first metal wire grid polarizing layer 270 are insulated from each other.

Figure 11B:
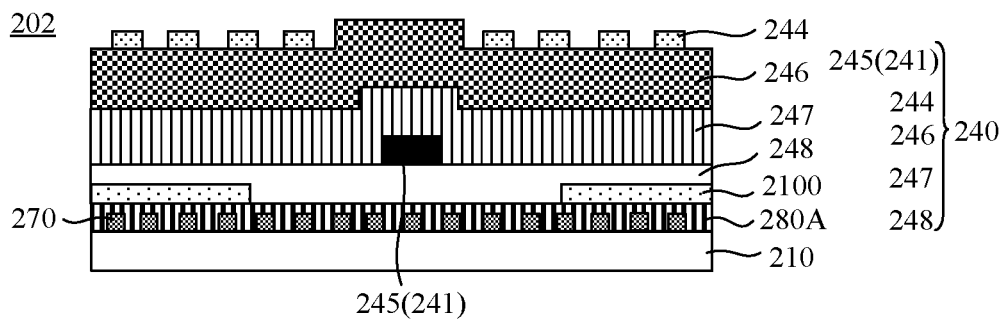
FIG. 11B is yet another sectional view of the first array substrate in FIG. 6 taken along the C-C line.
Figure 12A:
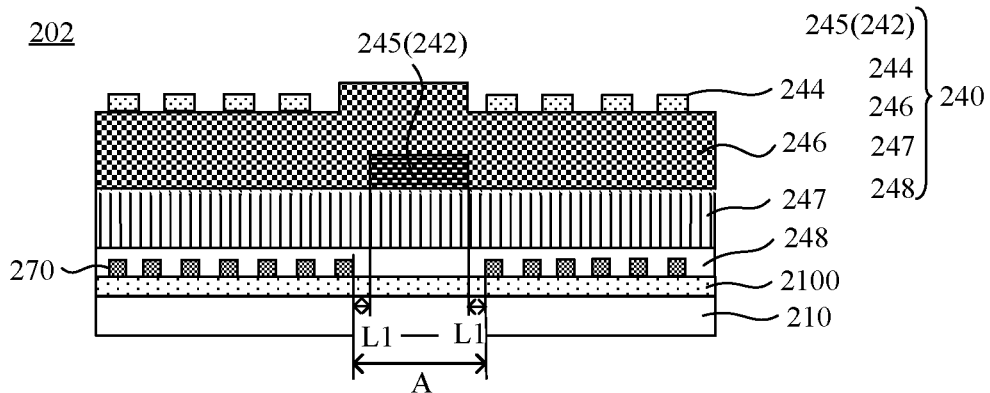
FIG. 12A is yet another sectional view of the first array substrate in FIG. 6 taken along the B-B line.
Figure 12B:
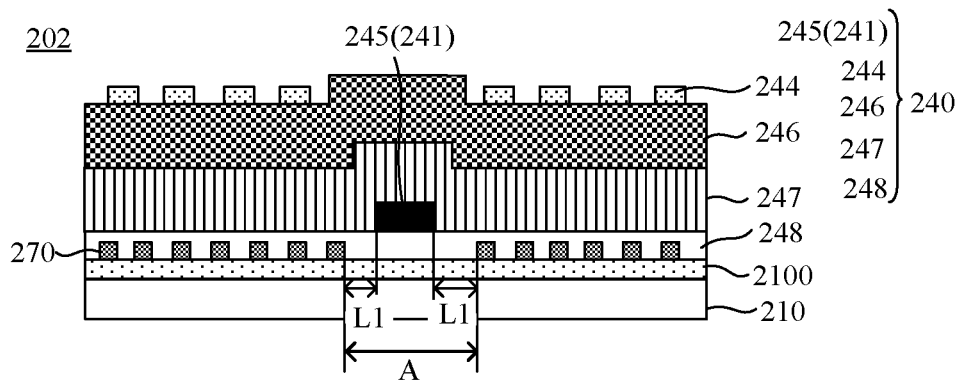
FIG. 12B is yet another sectional view of the first array substrate in FIG. 6 taken along the C-C line.
Figure 14B:
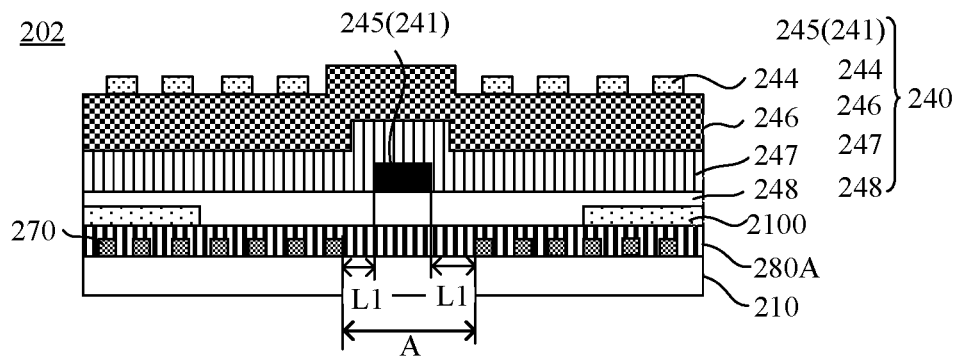
FIG. 14B is yet another sectional view of the first array substrate in FIG. 6 taken along the C-C line.

In an example where the first signal line 245 is the first gate line 241, as shown in FIGS. 11B and 14B, in the case where the first buffer layer 280A is disposed on the first substrate 210, the first buffer layer 280A is between the first common electrode layer 2100 and the first metal wire grid polarizing layer 270, and the first common electrode layer 2100 and the first metal wire grid polarizing layer 270 are insulated from each other.

It will be understood that, as shown in FIGS. 10A, 10B, 13A and 13B, in the case where the first buffer layer 280A is disposed on the first substrate 210, the first common electrode layer 2100 may also be stacked with the first metal wire grid polarizing layer 270, and the surface of the first common electrode layer 2100 is in direct contact with the surface of the first metal wire grid polarizing layer 270 that is adjacent to the surface of the first common electrode layer 2100.

Figure 13A:
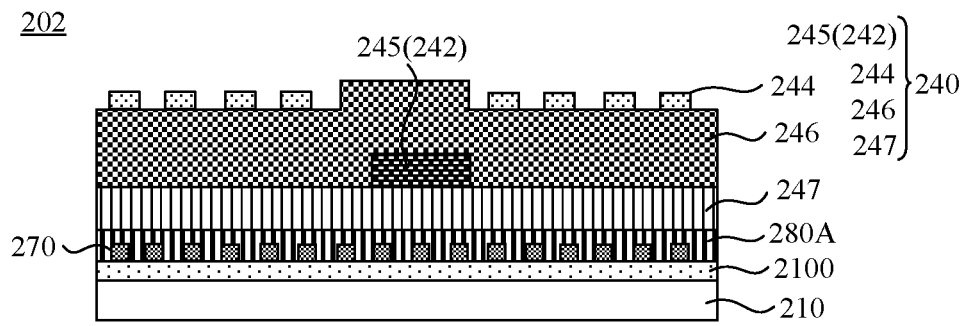
FIG. 13A is yet another sectional view of the first array substrate in FIG. 6 taken along the B-B line.

In an example where the first signal line 245 is the first data line 242, as shown in FIGS. 10A and 13A, in the case where the first buffer layer 280A is disposed on the first substrate 210, the first common electrode layer 2100 is stacked with the first metal wire grid polarizing layer 270, the surface of the first common electrode layer 2100 is in direct contact with the surface of the first metal wire grid polarizing layer 270 that is adjacent to the surface of the first common electrode layer 2100, and the first common electrode layer 2100 is located on the side of the first metal wire grid polarizing layer 270 proximate to the first substrate 210.

Figure 13B:
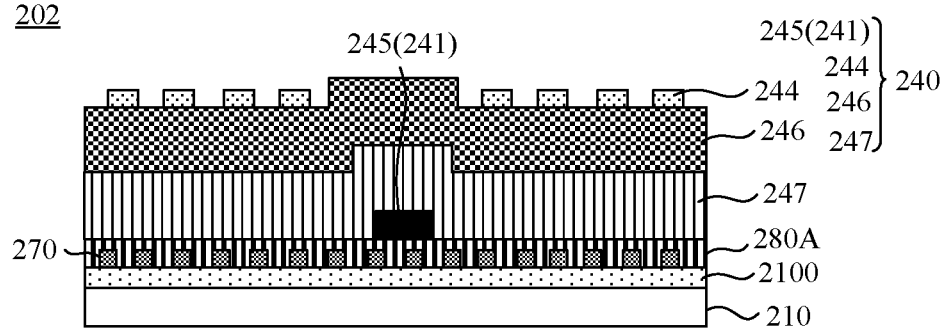
FIG. 13B is yet another sectional view of the first array substrate in FIG. 6 taken along the C-C line.

In an example where the first signal line 245 is the first gate line 241, as shown in FIGS. 10B and 13B, in the case where the first buffer layer 280A is disposed on the first substrate 210, the first common electrode layer 2100 is stacked with the first metal wire grid polarizing layer 270, the surface of the first common electrode layer 2100 is in direct contact with the surface of the first metal wire grid polarizing layer 270 that is adjacent to the surface of the first common electrode layer 2100, and the first common electrode layer 2100 is located on the side of the first metal wire grid polarizing layer 270 proximate to the first substrate 210.

In some embodiments, the first metal wire grid polarizing layer 270 is configured to transmit a common voltage signal. That is, the first metal wire grid polarizing layer 270 may be used as the first common electrode layer. In this way, the number of film layers of the display assembly 100 may be reduced, the thickness of the display assembly 100 may be reduced, a manufacturing process of the display assembly 100 may be simplified, and in turn, manufacturing costs of the display apparatus 1 are reduced.

The first pixel circuit layer 240 includes a plurality of first pixel electrodes 244 distributed in an array. Each first pixel electrode 244 substantially defines a light-emitting region of a sub-pixel. That is, the light-emitting region of the sub-pixel is substantially the same as a region where the first pixel electrode 244 of this sub-pixel is located.

Figure 15:
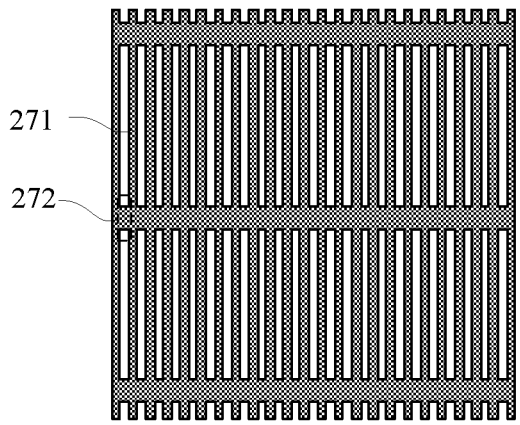
FIG. 15 is a structural diagram of a first metal wire grid polarizing layer, in accordance with some embodiments.

In the case where the first metal wire grid polarizing layer 270 is configured to transmit the common voltage signal, referring to FIG. 15, the first metal wire grid polarizing layer 270 includes the plurality of first metal bars 271 and a plurality of first connection portions 272. Two adjacent first metal bars 271 are connected through at least one first connection portion 272, and orthogonal projections of the plurality of first connection portions 272 on the first substrate 210 are separated from orthogonal projections of the plurality of first pixel electrodes 244 on the first substrate 210. The first connection portions 272 are used to electrically connect the plurality of first metal bars 271, so that the first metal wire grid polarizing layer 270 can transmit the common voltage signal. The orthogonal projections of the first connection portions 272 on the first substrate 210 are separated from the orthogonal projections of the first pixel electrodes 244 on the first substrate 210, so that light emitted from the light-emitting region may pass through the first metal wire grid polarizing layer 270, and light passing through the first metal wire grid polarizing layer 270 has a certain polarization direction.

Figure 16:
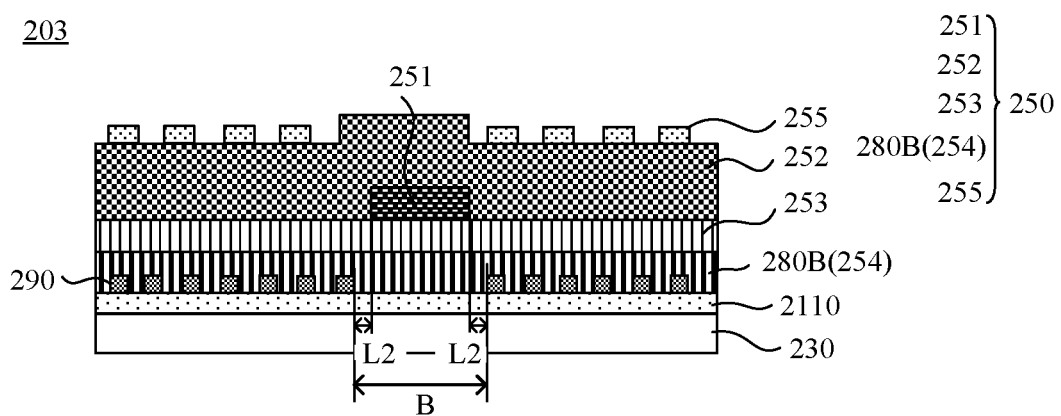
FIG. 16 is a structural diagram of a second array substrate, in accordance with some embodiments.
Figure 17:
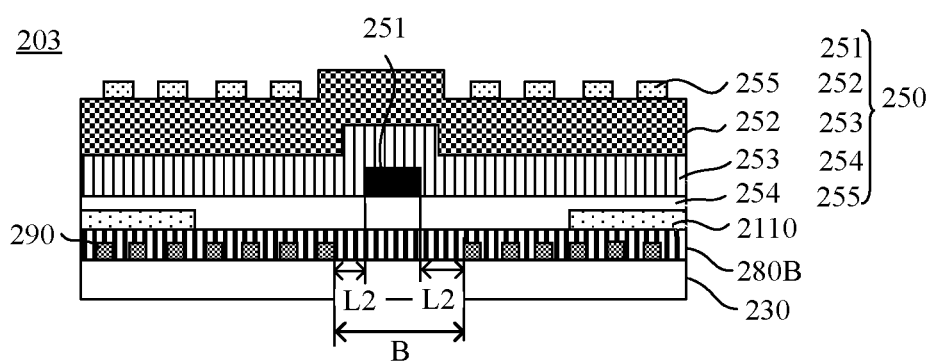
FIG. 17 is a structural diagram of another second array substrate, in accordance with some embodiments.

In some embodiments, referring to FIGS. 8, 16 and 17, the polarizing device 260 is the second metal wire grid polarizing layer 290. The second metal wire grid polarizing layer 290 is disposed between the third substrate 230 and the second pixel circuit layer 250, and the second metal wire grid polarizing layer 290 is electrically insulated from the second pixel circuit layer 250. As a result, the second metal wire grid polarizing layer 290 is prevented from being in direct contact with the second pixel circuit layer 250, and an influence of the second metal wire grid polarizing layer 290 on pixel circuits in the second pixel circuit layer 250 is reduced.

The second metal wire grid polarizing layer 290 is disposed between the third substrate 230 and the second pixel circuit layer 250, and thus the second pixel circuit layer 250 is between the second metal wire grid polarizing layer 290 and the second liquid crystal layer LC2. In this way, the influence of the second metal wire grid polarizing layer 290 on the electric field applied to the second liquid crystal layer LC2 may be reduced.

A structure of the second pixel circuit layer 250 is similar to the structure of the first pixel circuit layer 240, which will not be described in detail here.

In some embodiments, referring to FIGS. 8 and 16, the display assembly 100 further includes a second buffer layer 280B, and the second buffer layer 280B is disposed between the second metal wire grid polarizing layer 290 and the second pixel circuit layer 250. The second buffer layer 280B can separate the second metal wire grid polarizing layer 290 from the second pixel circuit layer 250, so that the second metal wire grid polarizing layer 290 is electrically insulated from the second pixel circuit layer 250.

A material of the second buffer layer 280B is the insulating material, which may be an inorganic material or an organic material. The inorganic material may include any one of the silicon nitride, the silicon oxynitride, and the silicon oxide, so that the second buffer layer 280B has a relatively high light transmittance.

In some embodiments, a thickness of the second buffer layer 280B is in a range from 1.27 μm to 7 μm. For example, the thickness of the second buffer layer 280B may be 1.27 μm, 1.3 μm, 3 μm, 5 μm, 7 μm, etc., which will not be listed here.

The thickness of the second buffer layer 280B is inversely proportional to the light transmittance of the second buffer layer 280B. That is, the thicker the second buffer layer 280B, the lower the light transmittance thereof. Therefore, in the embodiments of the present disclosure, the thickness of the second buffer layer 280B is less than or equal to 7 μm. As a result, it is conducive to improving the light transmittance of the second buffer layer 280B, and further improving the utilization rate of the backlight of the display apparatus 1; and moreover, it is conducive to reducing the thickness of the display assembly 100, so as to realize the lightness and the thinness of the display assembly 100.

In the case where the second metal wire grid polarizing layer 290 is disposed between the third substrate 230 and the second pixel circuit layer 250, capacitances may be generated between the second pixel circuit layer 250 and the second metal wire grid polarizing layer 290, and the capacitances will affect transmission of signals of the second pixel circuit layer 250. The thickness of the second buffer layer 280B is greater than or equal to 1.27 μm, so that a distance between the second metal wire grid polarizing layer 290 and the second pixel circuit layer 250 (which includes second data lines and second gate lines) may be increased. As a result, the capacitances between the second metal wire grid polarizing layer 290 and the second pixel circuit layer 250 may be reduced, thereby reducing the influence of the second metal wire grid polarizing layer 290 on the pixel circuits (including the second data lines and the second gate lines).

In some embodiments, as shown in FIGS. 16 and 17, the second pixel circuit layer 250 includes at least one second signal line 251. The second metal wire grid polarizing layer 290 includes second discontinuous region(s) B each extending in an extending direction of a second signal line 251. That is, an extending direction of a second discontinuous region B is the same as the extending direction of the second signal line 251. An orthogonal projection of the second signal line 251 on the third substrate 230 and an orthogonal projection of the second discontinuous region B on the third substrate 230 have an overlapping region. The second signal line(s) 251 include at least one of the second gate lines and the second data lines, which may be specifically determined according to actual usage needs and will not be limited in the embodiments of the present disclosure. In a case where the second wire grid polarizing layer 290 inlcudes a plurality of second metal bars, the plurality of second metal bars are not disposed in the second discontinuous region B.

The orthogonal projection of the second signal line 251 on the third substrate 230 and the orthogonal projection of the second discontinuous region B on the third substrate 230 have the overlapping region, which may be that orthogonal projections of the two (the second signal line 251 and the second discontinuous region B) completely overlap, or the orthogonal projections of the two partially overlap. In the case where the orthogonal projections of the two completely overlap, the orthogonal projection of the second signal line 251 may be completely located within the orthogonal projection of the second discontinuous region B, or the orthogonal projection of the second discontinuous region B may completely coincide with the orthogonal projection of the second signal line 251. In the case where the orthogonal projections of the two partially overlap, it may be that a portion of the orthogonal projection of the second discontinuous region B is located within the orthogonal projection of the second signal line 251, and the other portion of the orthogonal projection of the second discontinuous region B is located outside the orthogonal projection of the second signal line 251.

Similar to the first discontinuous region A arranged in the first metal wire grid polarizing layer 270, in the embodiments of the present disclosure, the second discontinuous region B is arranged in the second metal wire grid polarizing layer 290, which may reduce a facing area between the second metal wire grid polarizing layer 290 and the second signal line 251 (e.g. the second data line or the second gate line), and in turn, a capacitance formed between the second metal wire grid polarizing layer 290 and the second signal line 251 is reduced, and an influence of the second metal wire grid polarizing layer 290 on the second signal line 251 is reduced.

At least one insulating layer is disposed between two adjacent conductive layers. Based on this, as shown in FIGS. 16 and 17, the second pixel circuit layer 250 may further include a second passivation layer 252, a second gate insulating layer 253 and at least one insulating layer 254. In the case where the display assembly 100 includes the second buffer layer 280B, the at least one insulating layer 254 may include the second buffer layer 280B.

In some embodiments, borders of the orthogonal projection of the second signal line 251 on the third substrate 230 that extend in the extending direction of the second signal line 251 are within borders of the orthogonal projection of the second discontinuous region B on the third substrate 230 that extend in the extending direction of the second discontinuous region B; and in a width direction of the second signal line 251, there is a gap L2 between a border of the orthogonal projection of the second signal line 251 on the third substrate 230 that extends in the extending direction of the second signal line 251 and a border, close to the border of the orthogonal projection of the second signal line, of the orthogonal projection of the second discontinuous region B on the third substrate 230 that extends in the extending direction of the second discontinuous region B.

For example, a width of the gap L2 may be in a range from 3 μm to 4 μm. In this way, it is possible to prevent from having a directly facing portion between the second signal line 251 and the second metal wire grid polarizing layer 290 (the orthogonal projection of the second signal line 251 on the third substrate 230 is separated from the orthogonal projection of the second metal wire grid polarizing layer 290 on the third substrate 230), and the capacitance between the second metal wire grid polarizing layer 290 and the second signal line 251 may be avoided. According to experimental data, it can be known that, when a simulation is performed on the display assembly 100 of the display apparatus 1 with the display screen of 65 inches, the resolution of 8 K and the frequency of 60 Hz, a simulation effect of the display assembly 100 is best in a case where the width of the gap L2 is set in the range from 3 μm to 4 μm.

In some embodiments, the second pixel circuit layer 250 includes a plurality of second signal lines 251, and the plurality of second signal lines 251 include the second gate lines and/or the second data lines, which may be specifically determined according to actual usage needs and will not be limited in the embodiments of the present disclosure.

The second pixel circuit layer 250 includes the second gate lines and the second data lines, and the plurality of second signal lines 251 include the second gate lines and/or the second data lines. In this way, the orthogonal projection of the second signal line 251 on the third substrate 230 and the orthogonal projection of the second discontinuous region B on the third substrate 230 have the overlapping region, which may be that an orthogonal projection of the second gate line on the third substrate 230 has an overlapping region with the orthogonal projection of the second discontinuous region B on the third substrate 230; or an orthogonal projection of the second data line on the third substrate 230 has an overlapping region with the orthogonal projection of the second discontinuous region B on the third substrate 230. In the case where the plurality of second signal lines 251 include the second gate lines and the second data lines, orthogonal projections of the second gate line and the second data line on the third substrate 230 each have an overlapping region with an orthogonal projection of a respective second discontinuous region B on the third substrate 230.

In some embodiments, referring to FIG. 16, the display assembly 100 further includes a second common electrode layer 2110. The second common electrode layer 2110 and the second metal wire grid polarizing layer 290 are arranged in a stack, and a surface of the second common electrode layer 2110 is in direct contact with a surface of the second metal wire grid polarizing layer 290 that is adjacent to the surface of the second common electrode layer 2110. The second common electrode layer 2110 and the second metal wire grid polarizing layer 290 are both conductive layers, and they are in direct contact and electrically connected. As a result, the second common electrode layer 2110 is connected in parallel with the second metal wire grid polarizing layer 290, and thus an impedance of the second common electrode layer 2110 may be reduced. The expression "arranged in a stack" means that the second common electrode layer 2110 and the second metal wire grid polarizing layer 290 are arranged in sequence in a thickness direction of the third substrate 230, and the surface of the second common electrode layer 2110 is in direct contact with the surface of the second metal wire grid polarizing layer 290 that is adjacent to the surface of the second common electrode layer 2110 (that is, the second common electrode layer 2110 and the second metal wire grid polarizing layer 290 are two adjacent layers).

For example, the second common electrode layer 2110 may be disposed on a side of the second wire grid polarizing layer 290 away from the third substrate 230; or a second common electrode layer 2110 may be disposed on a side of the second wire grid polarizing layer 290 proximate to the third substrate 230.

In some embodiments, in the case where the second buffer layer 280B is disposed on the third substrate 230, the second common electrode layer 2110 is disposed on a side of the second buffer layer 280B away from the second metal wire grid polarizing layer 290 and is located between the second buffer layer 280B and the second pixel circuit layer 250. In this way, the second buffer layer 280B is between the second common electrode layer 2110 and the second wire grid polarizing layer 290, and the second common electrode layer 2110 and the second wire grid polarizing layer 290 are insulated from each other.

In an example where the second signal line 251 is the second gate line, as shown in FIG. 17, in the case where the second buffer layer 280B is disposed on the third substrate 230, the second buffer layer 280B is between the second common electrode layer 2110 and the second metal wire grid polarizing layer 290, and the second common electrode layer 2110 and the second metal wire grid polarizing layer 290 are insulated from each other.

It will be understood that, in the case where the second buffer layer 280B is disposed on the third substrate 230, the second common electrode layer 2110 may also be stacked with the second metal wire grid polarizing layer 290, and the surface of the second common electrode layer 2110 is in direct contact with the surface of the second metal wire grid polarizing layer 290 that is adjacent to the surface of the second common electrode layer 2110.

In some embodiments, the second wire grid polarizing layer 290 is configured to transmit a common voltage signal. That is, the second wire grid polarizing layer 290 may be used as the second common electrode layer. In this way, the number of film layers of the display assembly 100 may be reduced, the thickness of the display assembly 100 may be reduced, and the manufacturing process of the display assembly 100 may be simplified, and in turn, the manufacturing costs of the display apparatus 1 are reduced.

In some embodiments, the second pixel circuit layer 250 includes a plurality of second pixel electrodes 255 distributed in an array. Each second pixel electrode 255 substantially defines a light-emitting region of a sub-pixel. That is, the light-emitting region of the sub-pixel is substantially the same as a region where the second pixel electrode 255 of this sub-pixel is located.

Figure 18:
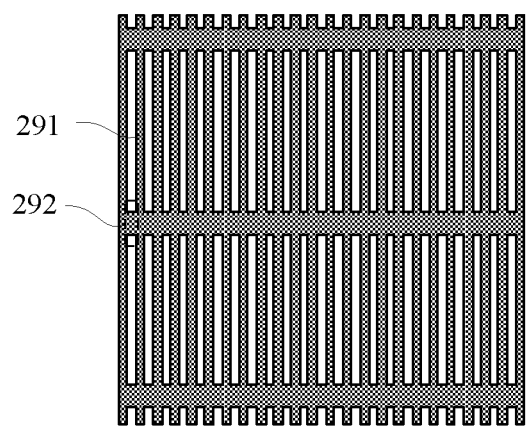
FIG. 18 is a structural diagram of a second metal wire grid polarizing layer, in accordance with some embodiments.

In the case where the second wire grid polarizing layer 290 is configured to transmit the common voltage signal, referring to FIG. 18, the second wire grid polarizing layer 290 includes a plurality of second metal bars 291 and a plurality of second connection portions 292. Two adjacent second metal bars 291 are connected through at least one second connection portion 292, and orthogonal projections of the plurality of second connection portions 292 on the third substrate 230 are separated from orthogonal projections of the plurality of second pixel electrodes 255 on the third substrate 230. The second connection portions 292 are used to electrically connect the plurality of second metal bars 291, so that the second metal wire grid polarizing layer 290 can transmit the common voltage signal. The orthogonal projections of the second connection portions 292 on the third substrate 230 are separated from the orthogonal projections of the second pixel electrodes 255 on the third substrate 230, so that light emitted from the light-emitting region may pass through the second metal wire grid polarizing layer 290, and light passing through the second metal wire grid polarizing layer 290 has a certain polarization direction.

It will be noted that a structure of the second array substrate 203 is similar to the structure of the first array substrate 202. Therefore, the drawings do not show all possible structures of the second array substrate 203, and a structural diagram of the second array substrate 203 may refer to a structural diagram of the first array substrate 202. The second array substrate 203 in any of the embodiments may be arbitrarily combined with the first array substrate 202 in any of the embodiments. That is, in the same display assembly 100, the structure of the second array substrate 203 and the structure of the first array substrate 202 may be the same or different, which are not specifically limited in the embodiments of the present disclosure.

In some embodiments, referring to FIG. 8, the display assembly 100 further includes a color filter 2120. The color filter 2120 may include a black matrix 2121 and filter portions 2122, and the filter portions 2122 may include red filter portions, green filter portions and blue filter portions. The color filter 2120 may be disposed on a side of the second substrate 220 proximate to the first substrate 210.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display assembly, comprising:
   a first substrate and a second substrate that are disposed opposite;
   a first liquid crystal layer located between the first substrate and the second substrate;
   a third substrate disposed at a side of the first substrate away from the second substrate;
   a second liquid crystal layer located between the first substrate and the third substrate;
   a first pixel circuit layer disposed between the first substrate and the first liquid crystal layer;
   a second pixel circuit layer disposed between the third substrate and the second liquid crystal layer;
   a polarizing device disposed on a side of the second pixel circuit layer away from the second liquid crystal layer; and
   a first metal wire grid polarizing layer disposed between the first substrate and the first pixel circuit layer, the first metal wire grid polarizing layer being electrically insulated from the first pixel circuit layer; wherein
   the first pixel circuit layer includes at least one first signal line;
   the first metal wire grid polarizing layer includes at least one first discontinuous region each extending in an extending direction of a first signal line, and an orthogonal projection of the first signal line on the first substrate and an orthogonal projection of a first discontinuous region on the first substrate have an overlapping region;
   borders of the orthogonal projection of the first signal line on the first substrate that extend in the extending direction of the first signal line are within borders of the orthogonal projection of the first discontinuous region on the first substrate that extend in an extending direction of the first discontinuous region; and
   in a width direction of the first signal line, a gap exists between a border of the orthogonal projection of the first signal line on the first substrate that extends in the extending direction of the first signal line and a border, close to the border of the orthogonal projection of the first signal line, of the orthogonal projection of the first discontinuous region on the first substrate that extends in the extending direction of the first discontinuous region.

2. The display assembly according to claim 1, further comprising:
   a first buffer layer disposed between the first metal wire grid polarizing layer and the first pixel circuit layer.

3. The display assembly according to claim 2, wherein a thickness of the first buffer layer is in a range from 1.27 μm to 7.0 μm.

4. The display assembly according to claim 1, wherein the at least one first signal line includes a plurality of first signal lines, and the plurality of first signal lines include first gate lines and/or first data lines.

5. The display assembly according to claim 1, further comprising:
   a first common electrode layer, wherein
   the first common electrode layer and the first metal wire grid polarizing layer are arranged in a stack, and a surface of the first common electrode layer is in direct contact with a surface of the first metal wire grid polarizing layer that is adjacent to the surface of the first common electrode layer; or
   the display assembly further comprises a first buffer layer, the first common electrode layer is disposed on a side of the first buffer layer away from the first metal wire grid polarizing layer and located between the first pixel circuit layer and the first buffer layer.

6. The display assembly according to claim 1, wherein the first metal wire grid polarizing layer is used as a first common electrode layer.

7. The display assembly according to claim 6, wherein the first pixel circuit layer includes a plurality of first pixel electrodes distributed in an array; and
   the first metal wire grid polarizing layer includes:
   a plurality of first metal bars; and
   a plurality of first connection portions, wherein two adjacent first metal bars are connected through at least one first connection portion, and orthogonal projections of the plurality of first connection portions on the first substrate are separated from orthogonal projections of the plurality of first pixel electrodes on the first substrate.

8. The display assembly according to claim 1, wherein the polarizing device is a second metal wire grid polarizing layer, the second metal wire grid polarizing layer is disposed between the third substrate and the second pixel circuit layer, and the second metal wire grid polarizing layer is electrically insulated from the second pixel circuit layer.

9. The display assembly according to claim 8, further comprising:
   a second buffer layer disposed between the second metal wire grid polarizing layer and the second pixel circuit layer.

10. The display assembly according to claim 9, wherein a thickness of the second buffer layer is in a range from 1.27 μm to 7.0 μm.

11. The display assembly according to claim 8, wherein the second pixel circuit layer includes at least one second signal line;
    the second metal wire grid polarizing layer includes at least one second discontinuous region each extending in an extending direction of a second signal line, and an orthogonal projection of the second signal line on the third substrate and an orthogonal projection of a second discontinuous region on the third substrate have an overlapping region.

12. The display assembly according to claim 11, wherein borders of the orthogonal projection of the second signal line on the third substrate that extend in the extending direction of the second signal line are within borders of the orthogonal projection of the second discontinuous region on the third substrate that extend in an extending direction of the second discontinuous region; and
   in a width direction of the second signal line, a gap exists between a border of the orthogonal projection of the second signal line on the third substrate that extends in the extending direction of the second signal line and a border, close to the border of the orthogonal projection of the second signal line, of the orthogonal projection of the second discontinuous region on the third substrate that extends in the extending direction of the second discontinuous region.

13. The display assembly according to claim 11, wherein the at least one second signal line includes a plurality of second signal lines, and the plurality of second signal lines include second gate lines and/or second data lines.

14. The display assembly according to claim 8, further comprising:
   a second common electrode layer, wherein
   the second common electrode layer and the second metal wire grid polarizing layer are arranged in a stack, and a surface of the second common electrode layer is in direct contact with a surface of the second metal wire grid polarizing layer that is adjacent to the surface of the second common electrode layer; or
   the display assembly further comprises a second buffer layer, the second common electrode layer is disposed on a side of the second buffer layer away from the second metal wire grid polarizing layer and located between the second buffer layer and the second pixel circuit layer.

15. The display assembly according to claim 8, wherein the second metal wire grid polarizing layer is used as a second common electrode layer.

16. The display assembly according to claim 15, wherein the second pixel circuit layer includes a plurality of second pixel electrodes distributed in an array; and the second metal wire grid polarizing layer includes:
   a plurality of second metal bars; and
   a plurality of second connection portions, wherein two adjacent second metal bars are connected through at least one second connection portion, and orthogonal projections of the plurality of second connection portions on the third substrate are separated from orthogonal projections of the plurality of second pixel electrodes on the third substrate.

17. A display apparatus, comprising:
   the display assembly according to claim 1; and
   a backlight module disposed on a side of the third substrate of the display assembly away from the second liquid crystal layer.

* * * * *